United States Patent [19]

Rauscher

[11] Patent Number: 5,655,074
[45] Date of Patent: Aug. 5, 1997

[54] METHOD AND SYSTEM FOR CONDUCTING STATISTICAL QUALITY ANALYSIS OF A COMPLEX SYSTEM

[75] Inventor: Karl Frederick Rauscher, New Tripoli, Pa.

[73] Assignee: Bell Communications Research, Inc., Morristown, N.J.

[21] Appl. No.: 498,958

[22] Filed: Jul. 6, 1995

[51] Int. Cl.[6] .............................. G06F 11/00; G06F 17/60
[52] U.S. Cl. ................... 395/183.14; 395/183.01; 364/552; 364/554
[58] Field of Search ................... 395/183.01, 184.01, 395/650, 700, 183.14, 183.02; 364/551.01, 554, 552

[56] References Cited

U.S. PATENT DOCUMENTS

| | | | |
|---|---|---|---|
| 4,044,244 | 8/1977 | Foreman et al. | 371/22.1 |
| 5,038,307 | 8/1991 | Krishnakumar et al. | 364/578 |
| 5,245,638 | 9/1993 | Gustafson | 395/184.01 |
| 5,253,331 | 10/1993 | Lorenzen et al. | 395/50 |
| 5,255,385 | 10/1993 | Kikuchi | 395/183.01 |
| 5,270,957 | 12/1993 | Murray | 364/554 |
| 5,293,323 | 3/1994 | Doskocil et al. | 364/551.01 |
| 5,539,907 | 7/1996 | Srivastava et al. | 395/700 |
| 5,548,718 | 8/1996 | Siegel et al. | 395/183.14 |

OTHER PUBLICATIONS

Hofmann et al., Distributed Performance Monitoring: Methods, Tools, and Applications, IEEE Tranas. on Parallel and Distrib. Systems, Jun. 1994, at 585.

Yan, Performance Tuning with AIMS, Twenty–Seventh Annual Hawaii International Conference on System Science (1994), at 625.

Lai et al., Total Reliability Management for Telecommunications Software, GLOBECOM 93: IEEE Global Telecommunications Conference, at 505.

MacEKG Manual, Micromat Computer Systems (1992).

*Primary Examiner*—Robert W. Beausoliel, Jr.
*Assistant Examiner*—Norman M. Wright
*Attorney, Agent, or Firm*—Joseph Giordano

[57] ABSTRACT

A method and system for providing a software tool that aids on the current state of the art of systems engineering of large software systems. The process begins with the step of gathering data on observations of a large number of characteristics about a software system (including historical and planned system adjustments) for each uniquely identifiable software component. Also gathered are historical data regarding faults or problems with each software component. The fault data is statistically mapped to measured characteristics of the software to establish a risk index. The risk index can be used as a predictive tool establishing which characteristics of the software are predictive of the software's performance or, alternatively, the risk index may be used to rank order the components to determine which components need less testing in a effort to save resources.

13 Claims, 4 Drawing Sheets

FIG. 2

HEADER:

Line 1

SCMP 1.0:[date]:Product-1:Product-2:Load-1:Load-2:Load-3:Load-4:Load-5:SACGL-10:
SACGL:09:SACGL-08:SACGL-07:SACGL-06:SACGL-05:SACGL-04:SACGL-03:
SACGL:02:SACGL-01:SPC:Language:TL:NCSL:CL:BL:CSL:SACGLn Calls:
USACGLn Calls:LSACGLn Call Span:SACGLn-1:SACGLn-1 Calls:USACGLn-1 Calls:
LSACGLn-1 Call Span:Or:UOr:Od:UOd:V:UV:LVS:MVS:BP:B:N:LNS:DNS:NE:MSC:
MFC:HPL:HPV:HPD:HPE:HEPL:::::::::::::::::::

Lines 2 +

DATA: [70 fields,":" delimited, populated with values as described below]

| FIELD NUMBER | FIELD NAME | FIELD DESCRIPTION | PRODUCT USAGE |
|---|---|---|---|
| 1 | Product-1 | product name - first designation | |
| 2 | Product-2 | product name - second designation | |
| 3 | Load-1 | software load - first designation | |
| 4 | Load-2 | software load - second designation | |
| 5 | Load-3 | software load - third designation | |
| 6 | Load-4 | software load - fourth designation | |
| 7 | Load-5 | software load - fifth designation | |
| 8 | SACGL-10 | software architecture component granularity level 10(high) | |
| 9 | SACGL-09 | software architecture component granularity level 09 | |
| 10 | SACGL-08 | software architecture component granularity level 08 | |
| 11 | SACGL-07 | software architecture component granularity level 07 | |
| 12 | SACGL-06 | software architecture component granularity level 06 | |
| 13 | SACGL-05 | software architecture component granularity level 05 | |
| 14 | SACGL-04 | software architecture component granularity level 04 | |
| 15 | SACGL-03 | software architecture component granularity level 03 | |
| 16 | SACGL-02 | software architecture component granularity level 02 | |
| 17 | SACGL-01 | software architecture component granularity level 01(low) | |
| 18 | SPC | service or platform code: use requirements document number or feature number as default | |
| 19 | Language | software programming language | |
| 20 | TL | number of lines in lowest level SACGL defined in fields 8-17 (SACGLn) | |
| 21 | NCSL | number of non-commentary source lines in SACGLn | |
| 22 | CL | number of comment lines in SACGLn | |
| 23 | BL | number of blank lines in SACGLn | |
| 24 | CSL | number of comment source lines in SACGLn | |
| 25 | SACGLn Calls | SACGLn calls made to SACGLn | |
| 26 | USACGLn Calls | unique SACGLn calls made to SACGLn | |
| 27 | LSACGLn Call Span | largest SACGLn call span (in lines) | |
| 28 | SACGLn-1 | number of SACGLn-1 units in SACGLn | |

METHOD AND SYSTEM FOR CONDUCTING STATISTICAL QUALITY ANALYSIS OF A COMPLEX SYSTEM

This invention relates to the science of software engineering. More specifically, the present invention relates to the field of analyzing software to determine potential problems in the software through an analysis of the characteristics of the software, including its development process, and determining the relationship of those characteristics to quantified aspects of the software's performance.

BACKGROUND OF THE INVENTION

The reliability of individual software modules is an ever increasing factor in determining overall system reliability as the size, scope, complexity and degree of interaction among modules of software systems have increased. Furthermore, given business dependence on software reliability, estimation of software performance has become critical to the successful development and deployment of large-scale software systems. Accordingly, software engineers have been striving to measure software quality. However, this effort to measure software quality has often times been frustrated by the subjective nature of the activity. In most instances, what is measured is not quality per se, but some indirect measurement that measures some manifestation of quality. However, software engineers often times do not know the precise relationship between the measurable characteristics of the software and the quality of the software. Various methods have been devised by those practicing in the art to quantify software quality.

As an example, the U.S. Air Force Systems Command has developed a number of quality indicators that are based on measurable design characteristics of a computer program. One such indicator is called the design structure quality index (DSQI). The DSQI is calculated from the following seven measured characteristics of a software system:

$S_1$=the total number of modules defined in the software architecture.

$S_2$=the number of modules whose correct function depends on the source of data input or that produces data to be used elsewhere.

$S_3$=the number of modules whose correct function depends on prior processing.

$S_4$=the number of database items (includes data objects and all attributes that define objects)

$S_5$=the total number of unique database items $S_6$=the number of database segments (different records or individual objects)

$S_7$=the number of modules with a single entry and exit

Once the above values are measured, the following intermediate values can be computed:

$D_1$=if the architectural design was developed using a distinct method then $D_1$=1 otherwise $D_1$=0

$D_2$=is a measure of module independence and equal $S_2/S_1$ $D_3$=is a measure of modules not dependent of prior processing and equals $1-(S_3/S_1)$ $D_4$=is a measure of database size and equal $1-(S_5/S_4)$ $D_5$=is a measure of database compartmentalization and equals $1-(S_6/S_4)$ $D_6$=is a measure of module entrance and exit characteristics and equals $1-(S_7/S_1)$.

Using these intermediate values, the DSQI can be computed using the following equation:

$$DSQI = \Sigma W_i D_i$$

where i=1 to 6, $w_i$ is the relative weighting of the importance of each of the intermediate values, and $\Sigma W_i = 1$. Weighting is often determined by a software engineer and is usually based on the professional judgement of the engineer. Therefore, there is a need in the art to objectively determine the value (weighting) of metrics such as they relate to software quality.

The value to the software engineer in computing the DSQI is to compare past designs to a design currently under development. If the DSQI is significantly lower than the average for past designs it is usually taken as an indication that further design work and review is indicated. However, it has yet to be objectively determined if the DSQI is an effective predictor of software quality. In addition, it doesn't take into account changes in the development process that may affect software quality. Therefore, there is also a need for objectively determining the value of such metrics as they vary between different software development environments over time.

The software engineering community has developed other metrics or indices for measuring software in an attempt to quantify and predict the quality of a new software product. IEEE Standard 982.1-1988 suggests a software maturity index that provides an indication of the stability of a software product based on changes that occur for each release of the product. Another measurement is a complexity measure proposed by Mr. Thomas McCabe (McCabe, T. J., and Butler, C. W., "Design Complexity Measurement and Testing," CACM, Vol. 32, no. 12, December 1989, pp 1415–1425). McCabe defines a software complexity measure that is based on the cyclomatic complexity of a program graph for a module. Experimental studies indicate a distinct relationship between McCabe's metric and the number of errors existing in source code as well as the time required to find and correct such errors. However, McCabe's metric does not objectively quantify the predicted performance of a software module.

More recently, statistical quality assurance methods have been incorporated into the software engineering process. The traditional prior art approach to statistical quality assurance generally is as follows:

1 Collect and categorize information about software defects.

2 Attempt to trace each defect to its underlying cause.

3 Under the principal that eighty percent of the defects can be traced to 20 percent of the causes, isolate the 20 percent vital few causes.

4 Once the vital few causes have been identified, move to correct the problems that have caused the defects.

The key to conducting a statistical analysis is tracing, or correlating, a measurable statistic to a software characteristic. As an example, software engineers and analysis may examine errors in design logic or incomplete or erroneous specifications as they relate to serious defects. However, the relationship is usually determined in an empirical study using a limited number of factors, which when determining a statistic then remains static. What is lacking in the prior art is a dynamic methodology and tool that can examine all measurable characteristics of a specific software system and its development environment and identify those characteristics that are high risk indicators of quality problems.

SUMMARY OF THE INVENTION

The forgoing problems are solved and a technical advance is achieved in accordance with the principles of my invention. My invention is a method and system for providing a software tool that improves on the current state of the art of systems engineering of large software systems. The objective of my invention is to assist software engineers in identifying characteristics of software that have the highest risk of having problems based on the history of that software system and the development environment. My invention provides the software engineer with a methodology and tool that can pinpoint high risk problems by using historical data of problems as they correlate with characteristics of the software. My inventive process begins with the step of gathering data on observations of a large number of characteristics about a software system (including historical and planned system adjustments) for each uniquely identifiable software component. Also gathered are historical data regarding faults or problems with each software component. The fault data is statistically mapped to measured characteristics of the software to establish a risk index. The risk index can be used as a predictive tool establishing which characteristics of the software are predictive of the software's performance or, alternatively, the risk index may be used to rank order the components to determine which components need less testing in a effort to save resources.

BRIEF DESCRIPTION OF THE DRAWINGS

FIG. 2 illustrates one embodiment of an information format of the requirements interface.

DETAILED DESCRIPTION

My invention is a methodology and software tool providing a software architecture based analysis for identifying risks of quality problems. As an example, a software engineer could use my invention to assess the risk of software updates. Risk in this context is defined as the probability of introducing or exposing a defect. In a typical software development process, all updates are subjected to several stages of inspection and testing. If the software update passes all stages, it soon becomes available for deployment. If the software can be identified as being risky then it can be subjected to additional verification steps, any of which may be customized to additionally minimize the identified risk. Or if a module of software can be identified as having a low risk of a defect, then quantity of testing can be reduced saving resources.

Figure 1:
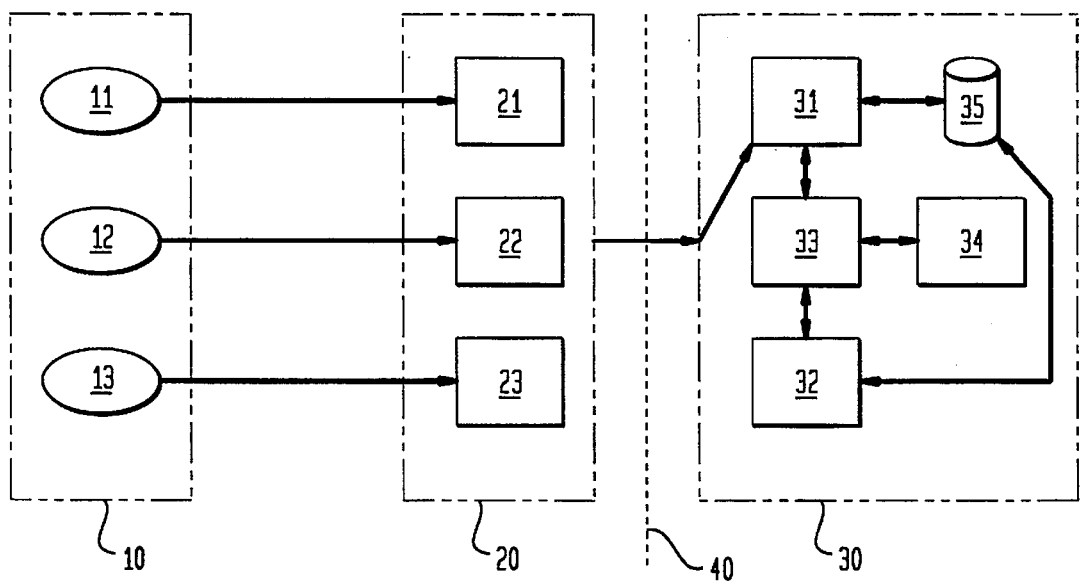
FIG. 1 depicts one embodiment of a system for software quality assurance in accordance with my invention.

FIG. 1 depicts one illustrative embodiment of my inventive software tool. Software data 10 is gathered for input into my Extraction and Generation System (EGS) Software Module 20. The software data is illustratively source code 11, development records 12, and information from the software change management system 13. This information is processed by individual software processes (21, 22, 23) within the EGS Module 20. Each of the software processes measures software characteristics for the software under analysis. As an example, process 21, the direct software component characteristic extractor, processes source code for the software system and measures specific characteristics of the software, (e.g. number of comment lines, number of comment words, number of definite articles, etc.). The software development records characteristic extractor 22 would process information from the development records to produce measurements on the development process (e.g. defects discovered, defect category, date of defect discovery, etc.). Similarly, the Software Change Management System Record Extractor process 23 would extract information from the Software Change Management System and create measurements of software change management (e.g. number of times updated, update tracking number, number of programmers associated with change). All of this measurement data would be communicated to my Expert Discriminator (ED) Module 30 over a standard interface 40. For all the information generated and transmitted over the interface 40, some of the information is primitive (i.e. raw) while other information may be derived (i.e. calculated). One example of derived information is a statistic that I have entitled the Function Call Precision Index (FCPI). This statistic is the measure of the number of times the functions called by a specific software component are mentioned by name in the comment text associated with that same software component. This derived statistic is calculated as $FCPI=[f/F]\times[W/100]$; where f is the number of function calls mentioned by named in the comment text, F is the number of function calls made by the source code of the software component, and W is the number of words in the comment text. Another example of derived information is a statistic that I have entitled the Component Interface Familiarity (CIF). This statistic is a derived measure of the number of times that a specific software component interfaces with the same entity in relation to its total number of interfaces with other entities. It is derived as $CIF=(i-I)/i$ where i is the total number of external interfaces in that the software component, and I is the number of unique interfaces that within that software component. It can be readily understood by those that practice in the art that any number of derived statistics can be calculated limited only by the skill and imagination of the practitioner. My invention though allows the use of a large number of derived statistics for use by the software engineer to identify dependencies between such derived information and measures of quality performance.

In an alternative embodiment of my inventive system, the ED module 30 may have a preprocessing function customizable by the user to derive additional statistics from the data received. In this embodiment, the software engineer has the capability to add additional derived information to the data collected. As an example, raw data may be collected for a software component for which the user knows is comprised of X number of files. Therefore, the raw data may be averaged over X number of files for processing by my method and system.

The ED Module 30 is comprised of a number of software sub-modules: the data receiver and integrator 31, a distribution analyzer 32, a dynamic application controller 33, a dynamic expert discriminator 34 and a database 35. My inventive method is illustrated through the operation and integration of these sub-modules.

Figure 3A:
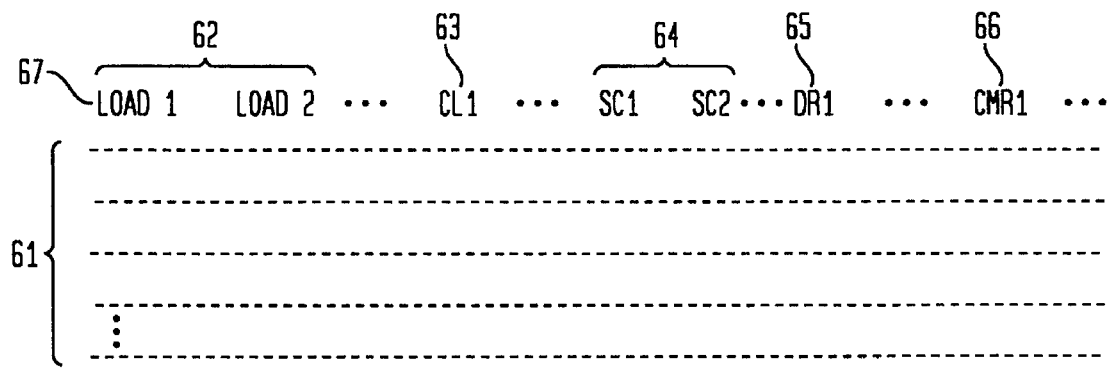
FIG. 3a illustrates one embodiment of an information file created by the data receiver and integrator process.
Figure 3B:
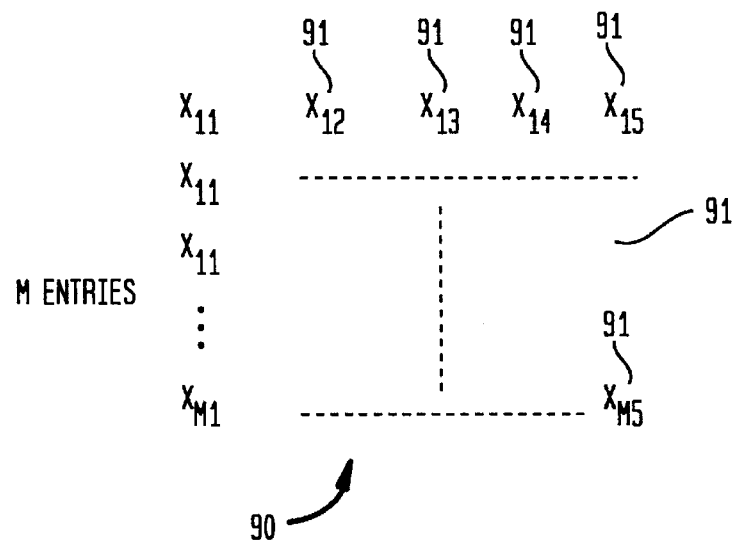
FIG. 3b depicts one embodiment of a Information File Matrix created in accordance with my inventive method.

First, the information received by the data receiver and integrator sub-module 31 is received in a format as specified by the requirements interface 40, one embodiment of which is illustrated in FIG. 2. This information is then accumulated by the data receiver and integrator process 31 into a file 60 as illustrated in FIG. 3a. Each row 61 in the file depicts the values measured for one software component whereas the columns depict categories of software characteristics; e.g. load ID 62, component level 63, measured software characteristics 64 (which may be raw information and/or derived information), development record characteristics 65, and/or change management characteristics 66. The information in this file is provided as input to the dynamic application controller process 32 for the creation of a Dynamic Application Control Matrix (DACM).

Figure 4:
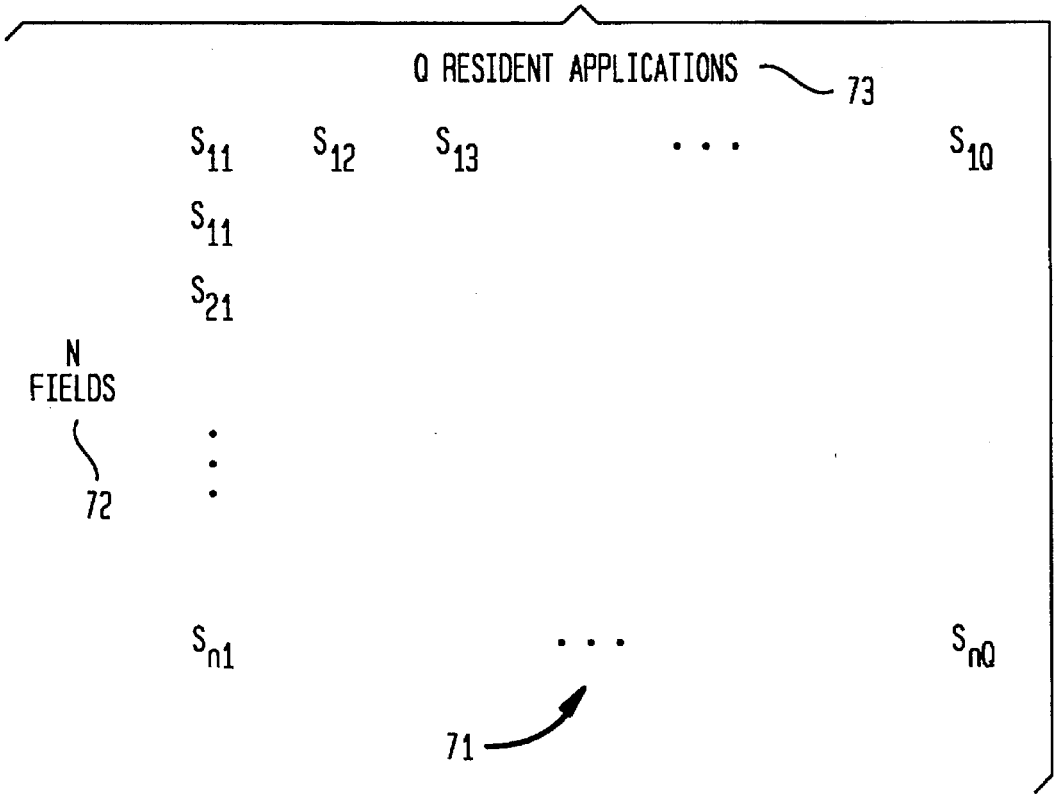
FIG. 4 depicts one embodiment of a Dynamic Application Control Matrix created in accordance with my inventive method.

The DACM 71, which is depicted in FIG. 4, can be considered an N×Q matrix with N being the number of fields 72 and Q being the number of resident applications 73. The values within the matrix 74 are a normalized statistic that represents the relationship between frequency distributions of dependent software characteristics. The values in the DACM are computed by the dynamic allocation control process 33 using the file of information 60 created by the data receiver and integrator sub-module 21. The dynamic allocation control process 33 would invoke a distribution analyzer process 32. The distribution analyzer process 32 would, for each software characteristic (including development record data and change management data), create a distribution across all software components. These individual distributions of software characteristics would then be stored in database 35. These distributions would be created using known statistical techniques (e.g. frequency distribution).

The distributions stored in the database 35 are used to create from the information file 60 a matrix of values 90, where each measured value is transposed into a normalized value ×91 representing its relative position in the frequency distribution around the median value. For example, if the number of NCSL for a particular component was 125 and the median value for NCSL was 100 and the 125 represented the sixty-five percent point (i.e. sixty-five percent of the measure values of NCSL are below 125), then the value in the matrix of values would be 0.3 (i.e. (65%–50%)/50%). This matrix of values 90 is called in the Information File Matrix (IFM) and is also stored in the database 35 associated with its information file 60.

The software engineer would select a subset of software characteristics to trial. When selected, the dynamic application control process 33 would create (1) an hybrid IFM representing data for the selected software characteristics extracted from the IFM, and (2)a DACM. The DACM is created by the dynamic application controller process 33 using the distributions created in process 32 and stored in database 35 for the selected characteristics. A statistic is calculated that represents the difference between the distribution of one selected software characteristics and the distribution of one of the development records or change management records. This statistic is then normalized to a value between negative one and one and becomes a value in a DACM for the appropriate software application and software characteristic.

My method for determining the differences between two distributions is as follows. A set number of percentile values are chosen. For example, if three percentiles are used, we may define three values $V_{75}$, $V_{50}$, and $V_{25}$. Where $V_{75}$ is the value associated with the 75th percentile in the distribution and $V_{50}$ is the value associated with the 50th percentile etc. Through experimental use, I have settled on using five values: $V_{10}$, $V_{25}$, $V_{50}$, $V_{75}$, and $V_{90}$. In general, it is best when practicing my method to use an odd number of values around a mean. The values for each of the percentile points in one distribution are located where they would fall within the percentile domain of in the other distribution. The differences between these percentile values are calculated and then summed for all the defined percentile values. As an example, if the median (50%) value of NCSL for the distribution of software components with bugs is 100, then where the value 100 would fall within the distribution of NCSL overall software components is determined and the difference calculated. This process is completed for each of the percentile values selected, and then the differences are totaled. In general form, the differences between the two distributions are calculated according to the following equation:

$$\Delta_V^{VB} = \sum_i [P_v[VB_i] - P_v[V_i]]$$

where $V_i$ is the value for the $i^{th}$ percentile in the distribution of all software components, $VB_i$ is the value of the $i^{th}$ percentile in the distribution of software components having a quality problem (i.e. bug), $P_v[x]$ is a function for determining the percentage in distribution for all software components for value x in the percentile domain of V, and i is one of the selected percentile values {e.g. 10, 25, 50, 75, 90}.

In my method, the sum of the percentiles (known herein as the normalization impact estimator) is used for normalizing the calculated difference. As an example, the normalization impact estimator for the five identified values is 90+75+50+25+10 or 250. Or in other words a normalized value is calculated by dividing Δ by the normalization impact estimator (NIE), or, as in the example, Δ/250. It is this normalized value that becomes an element in the DACM; each element in the DACM represents a normalized calculated value for a specific software characteristic as it relates to a specific software application module. As an example, from FIG. 4, element 71 depicts a normalized value calculated for software characteristic 72 for application 73.

Figure 5:
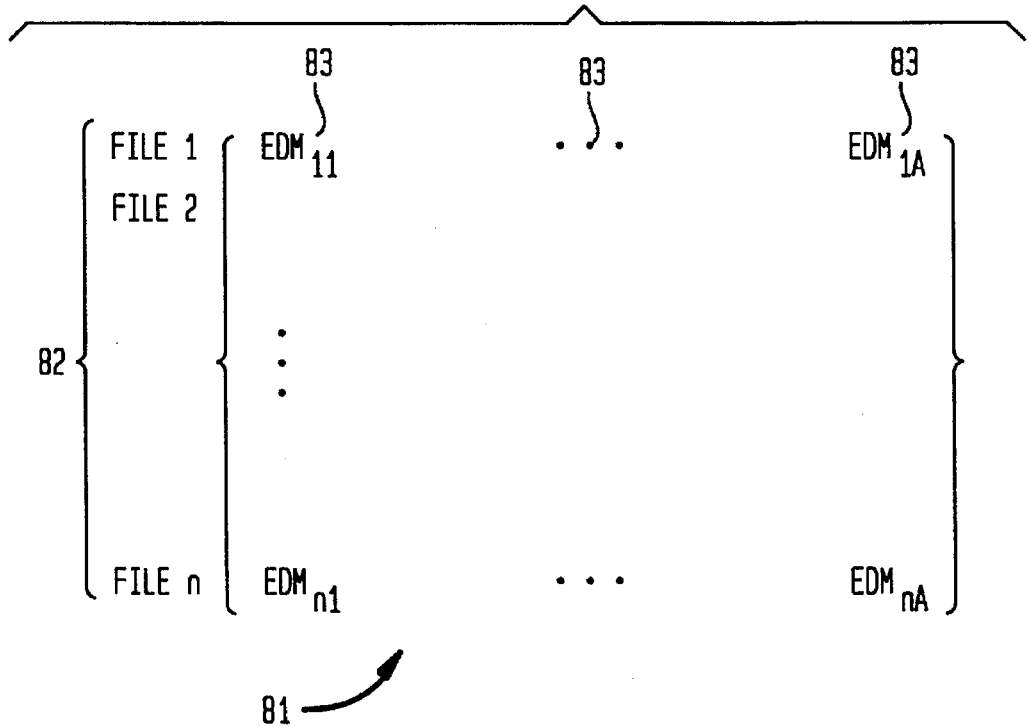
FIG. 5 depicts one embodiment of an Expert Discrimination Matrix.

In the expert discriminator process 34, the DACM is combined with the hybrid Information File Matrix to create an Expert Discriminator Matrix EDM (item 81 in FIG. 5). For each row 82 in the EDM 81 and each column 83, there is an value representing a correlation between that entry (file 1, file 2, . . . etc.) and the development or change management records being studied. The larger the value, the larger the probability of a correlation between that entry (file 1, file 2, . . . etc.) and the development records being studied. For example, a high number represents the degree of "risk" that a particular file contains a bug based on its characteristics and therefore that file requires special attention.

Figure 6:
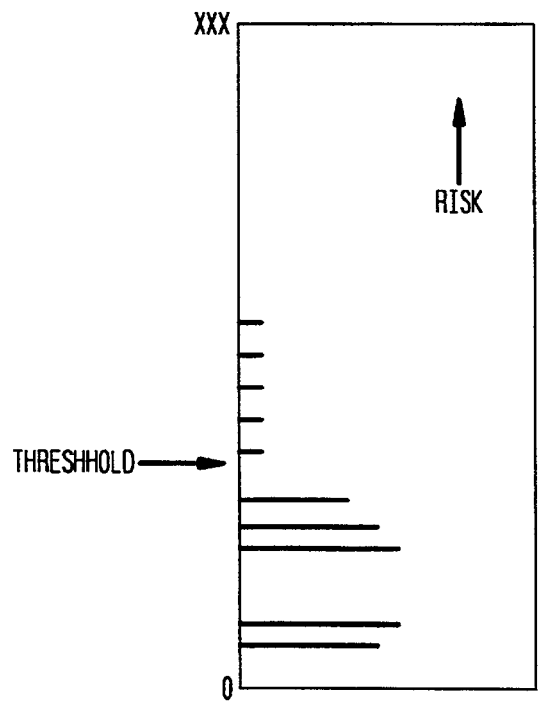
FIG. 6 illustrates one embodiment of graphical display depicting the risk index.

The elements of the EDM are not binary; i.e. they do not state "this file is risky" or "this file is not risky". These values are better understood as a range of values whereby the software engineer can establish a threshold, or multiple thresholds, for determining if a particular file requires special attention. My method and system also include the capability for representing these values in a virtual analog index as shown in FIG. 6. Each analog index represents a distribution of values from a column of an EDM. Seeing the distribution, the software engineer is presented with data regarding the software and the relationship of components (i.e. modules or files) to the risk of a problem in the component. The software engineer can use this data to establish a threshold for determining if future modules of new software require special attention.

My inventive method for producing an EDM can be easily understood when written in matrix algebra form. Assume for example that the hybrid IFM is comprised of three software modules with measured data on two software characteristics (a and b). This matrix can be depicted as.

$$\begin{bmatrix} a_0 & b_0 \\ a_1 & b_1 \\ a_2 & b_2 \end{bmatrix}$$

The DACM for this software application can be depicted as $$\begin{bmatrix} A_a^1 \\ A_b^1 \end{bmatrix}$$

with $A_a$ depicting the normalized value for the first measure software characteristic and with $A_b$ depicting the normalized value for the second software characteristic. Therefore, the EDM is calculated as follows $$\begin{bmatrix} a_0 & b_0 \\ a_1 & b_1 \\ a_2 & b_2 \end{bmatrix} \times \begin{bmatrix} A_a^1 \\ A_b^1 \end{bmatrix} = \begin{bmatrix} a_0 A_a^1 + b_0 A_b^1 \\ a_1 A_a^1 + b_1 A_b^1 \\ a_2 A_a^1 + b_2 A_b^1 \end{bmatrix}.$$

The values depicted in each row of the EDM are displayed in the virtual analog index. The values in this index range from 0 to 10 with 5 being normal and 10 indicating a strong dependency between characteristics and the evaluated component. Using these values, the software engineer can determine components of the software being of high risk so that additional resources can be applied to identify or correct problems. However, just as important, the software engineer can use the risk values to identify components of low risk from which testing resources can be diverted saving time and money for more important activities.

Once a DACM is established, my invention can be used to evaluate new software by producing a new EDM. This is accomplished by extracting from the new source code, measurements of software characteristics using my software component extractor process. This measured data is collected and sent to my expert discriminator module 30 over standard interface 40. The data receiver and integrator process 31 establishes an new information file with this new data. This information file is then used to create a new IFM based on the distributions previously created and stored in database 35. The values within the new IFM for the new software release are computed by finding where the measured values fall within the appropriate distribution from database 35. What is found is a percentile number from which is subtracted 50 to determine its position relative to the mean and this remainder is normalized by dividing it by 50.

For example, if the measured value of NCSL in a component of the new software is 65, then where the 65 falls in the previously created distribution of NCSL across all software components is found. Assume that if falls at the 55% point in the distribution (i.e. 55% of all software components have an NCSL measure less than 65), then the difference from the mean is found; i.e. 5%. This remainder is normalized by dividing by 50; i.e. 5/50 or 0.1. The 0.1 becomes the value in the new IFM for the NCSL attribute. This process is repeated for each measured attribute and the resulting values placed in the new IFM. For selected attributes, a hybrid IFM is created from the new IFM and then combined in process 34 with the existing DACM to produce a new EDM. The values in the new EDM can be graphically displayed in the virtual analog index next to the historical values previously produced. The software engineer, armed with this information, can then determine whether the new software has a higher risk of a defect and therefore would require greater testing or study to prevent a problem in implementation.

In addition, as defect data is collected on this new software, the DACM can be dynamically updated as software proceeds through the cycle of multiple releases. To update the DACM, the development records 12 and change management information 13 is processed in EGS 20 and sent to the ED 30 over interface 40. The new data is integrated in the information file 61 by the data receiver and integrator process 31. This new file is then used processes 32 and 33 to create a new DACM using my inventive method.

In an alternative embodiment, the values of an updated DACM may be determined by combining the values of previous DACM's with the values of the new DACM using a weighting process based on the version of the DACM. As an example, the most recent DACM created may be for a very recent release of the software which may not have much performance data (e.g. development or change management record data) available. Therefore, the software engineer may place a greater weight on the previous DACM and a lesser weight on the most recent DACM values until a body of development or change management information is available.

In either embodiment, my method and system are a powerful tool in the hands of software engineers to assimilate large amount of data relating to the software development process and improve the quality of software produced over time while at the same time reducing the costs of producing that software by eliminating the need to test every component equally. In a trial use of my method using data from an existing large scale software system, the ability of my method for isolating which patch loads of this large scale software system contain defects after final regular testing of the software in the delivery process, far exceeded that of any other statistical analysis tool used.

The ability of my system and method for helping software engineers to identify dependent attributes of software components can also be used to determine reusability of various software components based on their attributes as combined with other software components. This capability can be a great asset in improving software development productivity.

It is to be understood that my method and system for providing software architecture based analysis for identifying risks of quality problems as illustrated herein is not limited to the specific forms disclosed and illustrated, but may assume other embodiments limited only by the scope of the appended claims. As an example, the analysis of a software characteristics could be nested. Instead of comparing the distribution of one characteristic to the whole population but a second characteristic could be compared to the first and then to the overall distribution.

I claim:

1. A method of analyzing software comprising the steps of:

defining components of the software;

defining a plurality of attributes to be observed for each of said components;

measuring each of said plurality of attributes for each of said components;

gathering historic performance data for each of said components;

determining a first distribution of all of said measurements for a selected attribute over all of said components;

determining a second distribution of said performance data for each of said components; and determining the differences between said first distribution and said second distribution to identify the dependency between said selected attribute and said performance data.

2. The method as recited in claim 1 wherein said determining the difference step, comprises the steps of:

selecting set of percentile values;

finding the actual value in said first distribution for each of said selected percentiles;

identifying the percentile value where each of said values found in said finding step would fall in said second distribution;

subtract each of said found percentiles from each of said selected percentiles used find the actual values; and summing the values found in said subtracting step.

3. The method as recited in claim 2 wherein each of said sum of values is normalized.

4. The method as recited in claim 3 further including the step of arithmetically combining said normalized values with data representing the distribution of measured data of new software and producing values to assess risk.

5. The method as recited in claim 4 further including the step of graphically displaying said values for discrimination.

6. A method for conducting statistical analysis, comprising the steps of:

gathering measured data of a plurality of attributes of a plurality of items under study;

gathering quality data for said plurality of items under study;

determining, for each of said plurality of attributes, a frequency distribution of said gathered measured data over said plurality of items under study;

determining the frequency distribution of quality data for each of said plurality of items under study;

creating a first matrix of said gathered measured data where each value in the matrix depicts for one of said plurality of attributes and one of said plurality of items under study its the location in the distribution of values of said one attribute for all of said plurality of items under study;

developing a second matrix of values based on the differences in the distribution of said measured data and distribution of said quality data; and multiplying said first matrix with said second matrix to produce a third matrix of values depicting the degree of dependency between said attributes and quality data.

7. The method as recited in claim 6 wherein said values in said third matrix are graphically displayed in a plurality analog indices.

8. The method of claim 7 further including the steps of:

selecting a threshold value from said displayed values;

gathering new measurement data on a new set of items under study;

creating a fourth matrix of said new measurement data where each value in the matrix depicts the location in said distribution of values of said new measured data for all of said plurality of items under study;

multiplying said third matrix with said fourth matrix to produce a fifth matrix of values depicting the degree of dependency between the attributes of said new set of items under study and quality data;

displaying said new values from said fifth matrix over said displayed values; and examining said displayed new values to see which of them are above said selected thresholds to identify which of said new items under study have a high risk of a defect.

9. The method as recited in claim 6 where said items under study are component modules of software.

10. The method as recited in claim 9 wherein said attributes are measured characteristics of each of said component modules.

11. A system for evaluating the quality of software, with said software having component modules, said system comprising:

a first means for measuring characteristics of the source code of said software;

a second means for measuring development record data associated with said software;

a third means for creating a first matrix of data depicting the distribution of said measurement data;

a fourth means for comparing the distribution of said measurement data with said record data and creating a second matrix of values representing the differences between said distributions;

a fifth means for creating an expert discriminator matrix of values that is the product of said first matrix and said second matrix; and a graphical display means to display said values from said expert discriminator matrix in a virtual analog index.

12. The system as recited in claim 11 wherein said measured data and said record data is sent to said fourth means in a preselected standard format.

13. The system as recited in claim 12 further including a sixth means for gathering change management data to be sent to said third means wherein said change management data is included in said first matrix and is used by said fourth means for comparing the distribution of measurement data to said distribution of said change management data.

* * * * *